United States Patent [19]
Frejborg

[11] Patent Number: 5,607,589
[45] Date of Patent: Mar. 4, 1997

[54] MULTIPLE CONTOUR SCREENING

[75] Inventor: Frey A. Frejborg, Queensbury, N.Y.

[73] Assignee: CAE ScreenPlates Inc., Glens Falls, N.Y.

[21] Appl. No.: 469,867

[22] Filed: Jun. 6, 1995

[51] Int. Cl.$^6$ ................................ B01D 29/35; B07B 1/20
[52] U.S. Cl. .................. 210/415; 210/497.01; 209/250; 209/273; 209/306
[58] Field of Search ...................... 162/55, 251; 210/413, 210/414, 415, 497.01; 209/306, 273, 250

[56] References Cited

U.S. PATENT DOCUMENTS

| | | |
|---|---|---|
| 3,363,759 | 1/1968 | Clarke-Pounder . |
| 3,726,401 | 4/1973 | Bolton . |
| 4,264,438 | 4/1981 | Frejborg . |
| 4,529,520 | 7/1985 | Lampenius . |
| 4,717,471 | 1/1988 | Winkler . |
| 4,749,474 | 6/1988 | Young . |
| 4,776,957 | 10/1988 | Lampenius et al. . |
| 4,795,560 | 1/1989 | Chupka . |
| 4,812,229 | 3/1989 | Tra . |
| 4,836,915 | 6/1989 | Frejborg . |
| 4,880,540 | 11/1989 | Frejborg . |
| 4,950,402 | 8/1990 | Frejborg . |
| 4,986,900 | 1/1991 | Mason . |
| 5,000,842 | 3/1991 | Ljokkoi . |
| 5,073,254 | 12/1991 | Beisenherz et al. . |

FOREIGN PATENT DOCUMENTS

| | | |
|---|---|---|
| 2-264092 | 4/1989 | Japan . |
| WO91/05911 | 5/1991 | WIPO . |

*Primary Examiner*—Thomas M. Lithogow
*Attorney, Agent, or Firm*—Nixon & Vanderhye P.C.

[57] ABSTRACT

A screen cylinder or plate has a screening surface and accepts surface on opposite faces, and screens pulp flowing in a flow direction to separate accepts from rejects. A number of substantially parallel macro grooves are formed in the screening surface generally transverse to the flow direction, and a number of parallel micro grooves are formed in the screening surface within each macro groove also generally transverse to the flow direction. The macro grooves induce shear stress in the reject material flowing in the flow direction to keep it in constant motion and to prevent it from forming a mat on the screening surface. The micro grooves induce micro turbulence into the pulp at the immediate area of screening openings extending from each micro groove to the accepts surface, to fluidize the pulp so that accepts readily pass through the screening openings toward the accepts surface. Each micro groove within a macro groove is located further away from the accepts surface moving in the flow direction. The contour of each micro groove preferably includes a slightly slanted upstream wall, a sloped downstream wall, and a depression between the upstream and downstream walls. The depression may include a substantially flat surface, or be a continuation of the downstream wall; the slots or holes forming the screening openings are provided in the depression. It is possible to screen with a rejects rate of about 3–10% at debris removal efficiency of above about 85%.

29 Claims, 3 Drawing Sheets

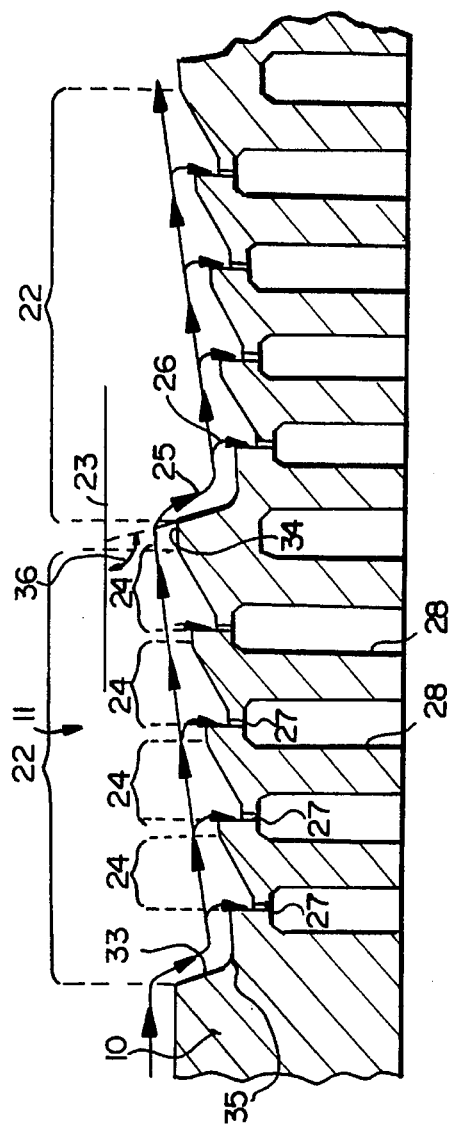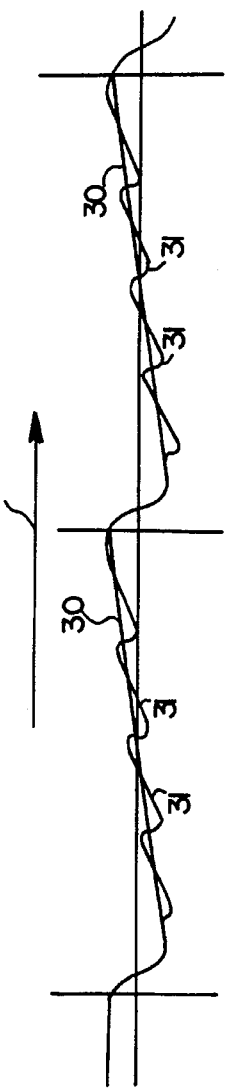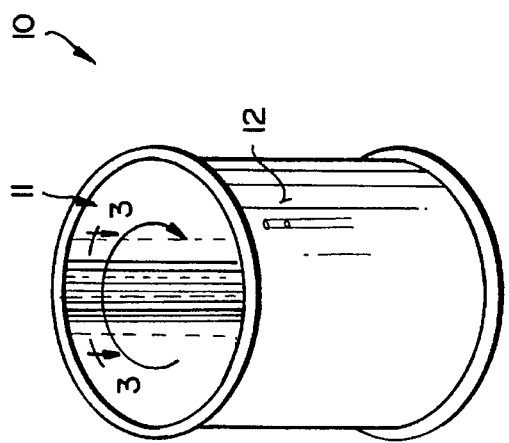

MULTIPLE CONTOUR SCREENING

BACKGROUND AND SUMMARY OF THE INVENTION

In the development of screen cylinders and plates having a screening surface and an accepts surface on opposite faces thereof, for screening pulp flowing in a flow direction, to separate accepts from rejects, the introduction of contoured cylinders and plates was a dramatic breakthrough in the art. Particularly with the contoured cylinders of U.S. Pat. No. 4,529,520 (the disclosure of which is hereby incorporated by reference), sold commercially under the trademark PRO-FILE® by CAE ScreenPlates Inc. of Glens Falls, N.Y., it has been possible to increase debris removal efficiency dramatically while maintaining throughput, or to increase throughput dramatically while maintaining the same debris removal efficiency. The particular surface manifestations defining the contour of such cylinders direct flow toward the slots or round holes in the screen surface (connected to the accepts surface) for maximum throughput, while causing the flow of pulp to turn, inducing micro-turbulence which fluidizes the pulp at the slots or holes, facilitating passage of accepts through the slots or holes. Such cylinders thus have optimized debris removal efficiency since they can run smaller holes or slots than in any earlier screen design without negatively impacting throughput.

While contoured screens have become the standard in the industry now, and are used in more than half of the pressure screen machines in North America, such screens have not been as enormous an advance in the art with respect to the screen's ability to operate at smaller reject rates, as compared to the increase in debris removal efficiency provided thereby. An operational parameter that is significant is the screen's ability to concentrate the rejects (that is the reject, or undesirable, material, such as shives) in the rejects stream and thereby reject out less of the desirable material into the rejects stream (providing it in the accepts stream instead). This may in part be due to the inclination of the reject material (e.g. shives) to form a mat or layer at the entry side of the screen plate or cylinder, hindering the passage of accepts through the screen slots or holes.

As taught by co-pending application Ser. No. 08/286,440 filed Aug. 4, 1994 [atty. dkt. 1497-21], the disclosure of which is hereby incorporated by reference herein, the selection of contour screen slot or hole configurations is important, including a requirement for more aggressive contours at the reject end. The present invention takes this contour selection procedure a step further and introduces a unique macro/micro-turbulence creating environment suitable in some applications only at the reject end of the cylinder, while in others over the entire cylinder.

According to the present invention, a screen cylinder or plate construction is provided which retains all of the benefits of the conventional contoured screen cylinders, such as the PROFILE® screen cylinder, while also improving the screen cylinder's ability to operate at smaller reject rates. According to one aspect of the present invention, this is accomplished by providing a particular contour of the screen surface (particular surface manifestations) so that the reject material is maintained highly turbulent. According to the present invention shear stresses are induced into the reject material so that the reject material is kept in substantially constant motion.

According to one aspect of the present invention a screen cylinder having a screening surface and an accepts surface disposed on opposite faces thereof, for screening pulp flowing in a flow direction to produce accepts, and rejects comprising reject material, with screen openings extending between the screening and accepts surfaces, is provided. The screen cylinder includes: A plurality of substantially parallel grooves disposed substantially perpendicular to the flow direction, formed in the screen surface, and including surface manifestations for inducing shear stresses in the reject material flowing with pulp in the flow direction to keep the reject material in substantially constant motion to prevent a mat or layer of reject material forming on the screening surface, and for inducing micro turbulence into pulp flowing in the flow direction at the immediate area of the screening openings at the screening surface, to fluidize the pulp thereat so that accepts readily pass through the openings toward the accepts surface.

According to another aspect of the present invention, a screen cylinder or plate having a screening surface and an accepts surface on opposite faces thereof is provided. The screen cylinder or plate comprises the following elements: A plurality of substantially parallel macro grooves formed in the screening surface generally transverse to the flow direction. A plurality of substantially parallel micro grooves formed in at least a portion of the screening surface within each macro groove and generally transverse to the flow direction. And, each of the micro grooves comprising contoured surface manifestations which induce micro-turbulence to fluidize pulp at the immediate area of screening, and at least one opening extending between the screening surface and the accepts surface for allowing passage of accepts therethrough.

In the screen cylinder or plate described above, preferably each of the micro grooves has substantially the same contour of surface manifestations, and the macro grooves each have a contoured configuration that simulates the contour of each of the micro grooves within it. Typically about four micro grooves are provided in each of the macro grooves (normally between three and five), and they are formed in the entire screening surface, or only that portion adjacent (e.g. the closest one-tenth to one-half of the cylinder) the rejects end of the cylinder.

The micro grooves may have any desired contour and surface manifestations which induce micro-turbulence in the pulp. Of course the configuration of the PROFILE® commercial cylinder and equivalents thereto are most desirable (equivalents being shown in U.S. Pat. Nos. 4,529,520, 4,950,402, 5,000,842, 4,880,540, and 5,073,254, among others, and in PCT published application WO 91/05911 published May 2, 1991, and Japanese published patent application no. Hei 2-264092 published Oct. 26, 1990), however other configurations can also be employed.

The desired configuration for the screening surface, which is similar to the PROFILE® conventional screen cylinders, includes an upstream wall generally transverse to the flow direction, a depression located closer to the accepts than the upstream wall, and a downstream wall extending gradually from the depression toward the upstream wall of the next groove, the at least one opening (slot or drilled hole) extending at least in part from the depression to the accepts surface. While the upstream wall can be completely perpendicular (that is make a 90° angle with respect to the flow direction), most desirably it makes an angle of about 70°–130° (preferably about 95°–105°), and is substantially planar. The downstream wall also is preferably substantially planar and makes an angle of about 5°–60° with respect to the flow direction. The depression may be defined by a continuation of the downstream wall, or may be a substantially flat surface substantially parallel to the flow direction, and the slots or holes are preferably provided in that substantially flat surface, or whatever surface is adjacent the upstream wall. The slots or holes are preferably located as close to the upstream side wall as practical.

The configuration also preferably comprises first substantially flat portions substantially parallel to the flow direction provided between the downstream side wall of one micro groove and the upstream side wall of the next, with second substantially flat portions substantially parallel to the flow direction being provided between adjacent macro grooves. The macro grooves preferably each have an upstream side wall that is not part of a micro groove. While the upstream side wall of a macro'groove is preferably also generally transverse to the flow direction, it typically makes an angle of about 100°–130° (preferably about 100°–110°) with respect to the flow direction, preferably an angle greater than the angle of a micro groove upstream wall. Also the length, in the flow direction, of a second flat portion is preferably greater than the length of a first flat portions.

Each of the downstream walls of the micro grooves also has a peak portion, which is the portion of the downstream wall most remote from the accepts surface. These peak portions preferably are provided in substantially a straight (imaginary) line, which line makes an angle of about 5°–15° (e.g. about 8.36°) to the flow direction, the line extending from the first micro groove within a macro groove in the flow direction, to the last micro groove within a macro groove in the flow direction.

According to another aspect of the present invention a screen cylinder or plate having a screening surface and an accepts surface is provided which comprises the following elements: A plurality of substantially parallel consecutive grooves formed in the screening surface, each groove having at least one opening extending between the screening surface and the accepts surface, at an opening-receiving area spaced from the accepts surface; and at least three substantially consecutive grooves have significantly different spacings of the opening-receiving areas thereof from the accepts surface. The at least three substantially consecutive grooves preferably comprise four or five grooves per pattern, and are disposed in sequence so that in the direction of flow the spacings of the opening-receiving areas thereof from the accepts surface increase. The consecutive grooves with different spacings are preferably in repeating patterns substantially completely covering the screen surface.

The invention also relates to a pressure screen for screening pulp utilizing a screen cylinder as described above. The pressure screen also includes a foil, means for moving the foil and the screen cylinder with respect to each other (typically one or both are rotated), an inlet for pulp, an accepts outlet, and a rejects outlet.

According to still another aspect of the present invention a method of screening pulp having a consistency of about 1–5% to produce accepts and rejects is provided. The method comprises the steps of simultaneously: (a) Moving the pulp in a flow direction so that it moves relative to the screening surface. (b) Inducing shear stresses in rejects material adjacent the screening surface to keep the rejects material in constant motion so that the rejects material does not form a mat or layer on the screening surface. And, (c) inducing micro turbulence in pulp immediately adjacent the screening openings to fluidize the pulp thereat so that accepts readily pass through the openings toward the accepts surface. Steps (a) through (c) may be practiced at a reject rate of about 3–10% (e.g. about 5%), while having a debris removal efficiency (Ec) of above about 85%. The screen has a rejects end, and steps (b) and (c) may be collectively practiced only adjacent (e.g. in the bottom one-tenth to one-half) of the rejects end.

It is the primary object of the present invention to provide screen plates or cylinders operable at small reject rates to efficiently screen rejects from pulp, the screen cylinders or plates utilized with pressure screens in an advantageous method of screening pulp. This and other objects of the invention will become clear from an inspection of the detailed description of the invention and from the appended claims.

BRIEF DESCRIPTION OF THE DRAWINGS

FIG. 1 is a top perspective view of an exemplary screen cylinder according to the present invention;

FIG. 3 is a side cross-sectional view, greatly enlarged for clarity of illustration, of the contour of the surfaces of an exemplary screen cylinder or plate according to the invention, schematically illustrating the flow path of pulp being screened thereby;

FIG. 4 is a graphical representation of the flow path of pulp with respect to the screen cylinder or plate configuration of FIG. 3 showing both the micro and macro flow patterns of the pulp;

DETAILED DESCRIPTION OF THE DRAWINGS

Figure 2:
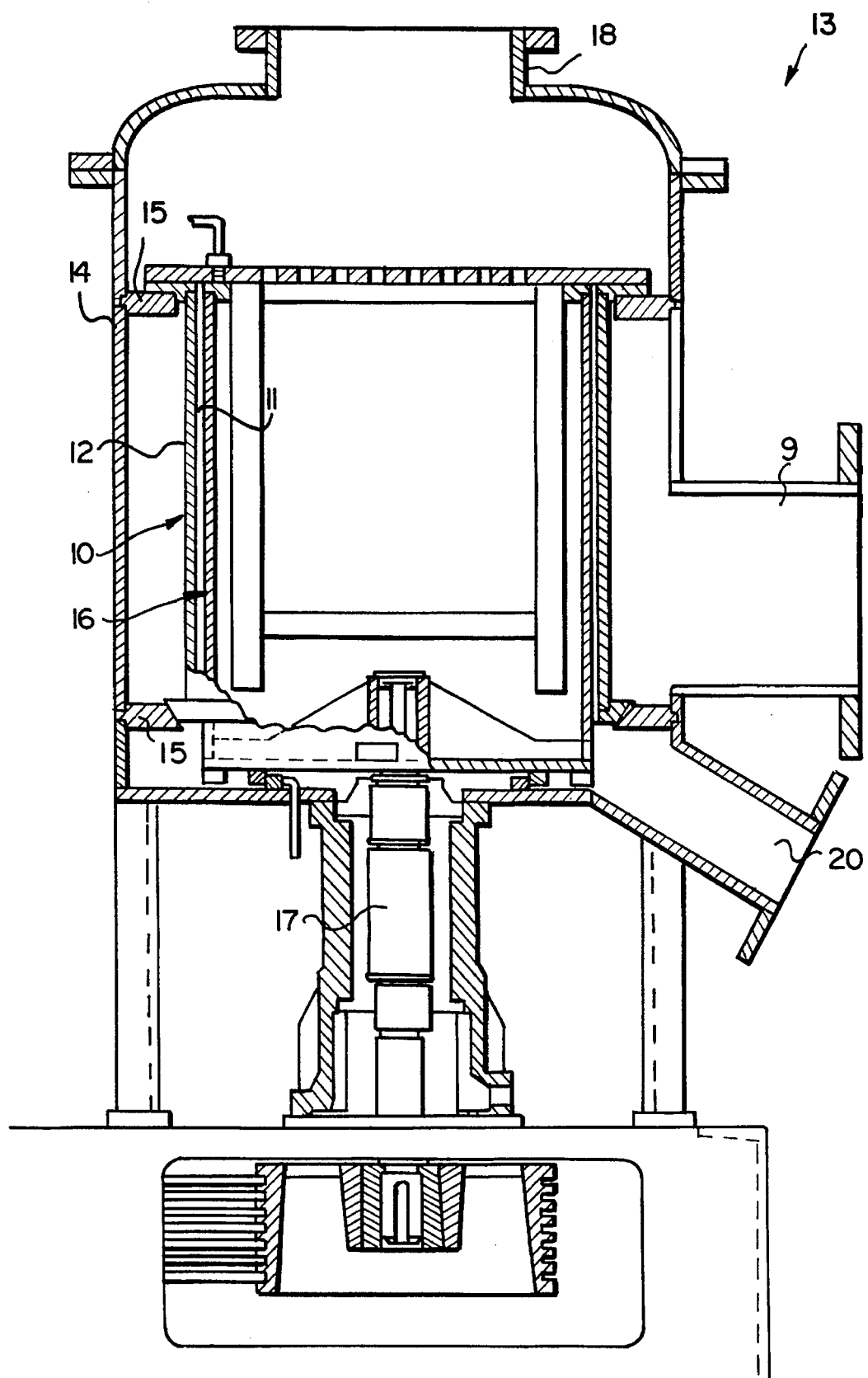
FIG. 2 is a side cross-sectional view, partly in elevation, of a conventional pressure screen utilizing an exemplary screen cylinder according to the present invention.

An exemplary screen cylinder according to the present invention is shown generally by reference numeral 10 in FIG. 1. In the embodiment actually illustrated in the FIG. 1, the interior surface of the screen cylinder is a screening surface 11, while the exterior surface 12 is an accepts surface, the surfaces 11, 12 being on opposite faces of the screen cylinder 10. However, as is conventional, the screening surface 11 may either be the interior or exterior surface of the cylinder 10.

FIG. 2 schematically illustrates a pressure screen 13, of conventional design, including a housing 14 in which a screen cylinder 10 according to the present invention may be utilized. The screen cylinder 10 according to the present invention illustrated in FIG. 2 is mounted on the stationary mounting elements 15 within the housing 14 so that it is stationary with respect to the housing 14. Mounted within the screen cylinder 10 is a foil or rotor 16 which is rotated about a vertical axis defined by shaft 17 so that there is relative movement between the screening surface 11 and the foil 16, causing the pulp to flow past the screen surface in a flow direction to separate accepts from rejects.

The housing 14 includes an inlet 18 for pulp, an accepts outlet 19 for pulp that has passed through slots or round openings in the screen 10, and a rejects outlet 20 for reject material which does not pass through the screen 10. According to the present invention it is desired to minimize the reject rate, that is to concentrate the rejects in the rejects outlet 20 so that the least amount of accepts (desirable material) passes out through the rejects outlet 20 as is possible. It is desired to optimize reject rate while still retaining an appropriate throughput and high debris removal efficiency.

FIG. 3 is a representation of the contour screen screening surface 11 of the screen 10, also showing the accepts surface 12. In FIG. 3, the surfaces 11, 12 are shown in a linear configuration, essentially the configuration that they would be in if in plate form rather than cylindrical form, and essentially the configuration which they are in before the steel or other metal forming the screen cylinder 10 is curved into cylindrical form.

The screen surface 11 as illustrated in FIG. 3 comprises a plurality of macro grooves 22, provided in repeating patterns along the screening surface 11 and substantially completely covering the screening surface 11. The grooves 22 are substantially transverse to the general flow direction 23 of pulp being screened. The grooves 22 can extend substantially the entire length (height) of the screen cylinder 10, or more typically are interrupted at various points along the screen cylinder by load bearing bands.

Disposed within each macro groove 22 is a plurality of micro grooves 24, four micro grooves 24 within each macro groove 22 being illustrated in FIG. 3. Preferably at least three micro grooves are provided, and normally four or five, within each macro groove 22, but almost any reasonable number can be provided.

The continuous and branching arrows 25, 26, in FIG. 3 schematically illustrates the flow paths of the pulp during screening. The pulp flow 25 includes reject material, while primarily accepts pass in the direction of arrows 26, to pass through an opening 27 associated with each micro groove 24 and extending from the screening surface 11 to the accepts surface 12. The openings 27 are, as is conventional, typically slots, but may comprise substantially round (drilled) holes. The openings 27 also are enlarged—as indicated at 28—shortly after the screening surface 11, as is conventional, so that once accepts pass through the openings 27 they pass unrestricted past the accepts surface 12 to the accepts outlet 19 (FIG. 2).

FIG. 4 schematically illustrates the overlay between the macro grooves 22 and micro grooves 24 of FIG. 3. In FIG. 4, the continuous line 30 roughly indicates the shape of the macro grooves 22, while the continuous line 31 roughly illustrates the contour of the micro grooves 24. As seen most clearly in FIG. 4, preferably the micro grooves as schematically represented by line 31 have substantially the same general contour as the macro grooves represented by the line 30.

The purpose of the macro grooves 22 according to the present invention is to keep the rejects material, such as shives, in the pulp flowing generally in pulp flow direction 23 in substantially constant motion to prevent a mat or layer of rejects material from forming on the screening surface 11 and interfering with the passage of accepts through the slots or holes 27. The macro grooves 22 induce shear stresses in the rejects material, keeping it in constant motion.

The purpose of the micro grooves 24 is to direct the flow of pulp toward the slots or holes 27 for maximum throughout, while at the same time causing substantially right angle turns of the flow to induce micro-turbulence which fluidizes the pulp. Fluidization of the pulp causes the accepts to flow more readily through the openings 27. In this regard the micro grooves 24 function in the same manner that the grooves in the conventional PROFILE® contour screen cylinder.

Figure 5:
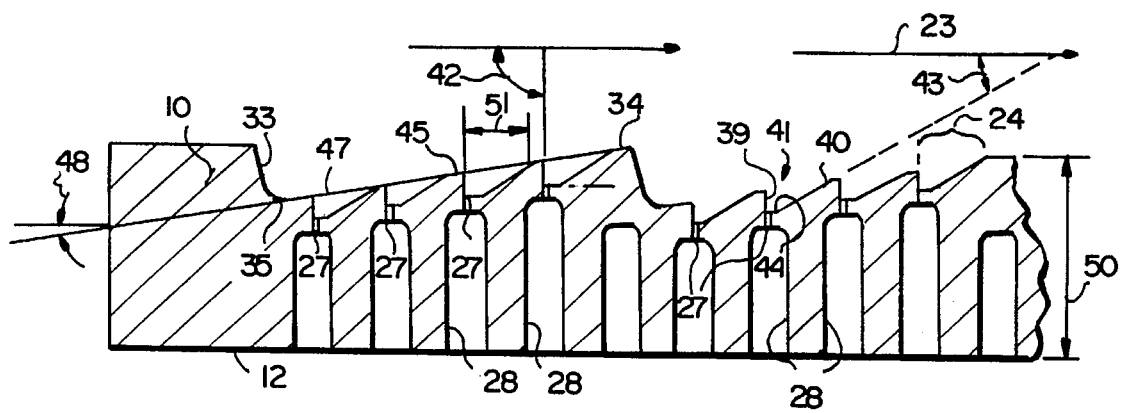
FIG. 5 is a view like that of FIG. 3 showing the configuration of a cylinder or plate according to the invention with eight slots per inch.
Figure 6:
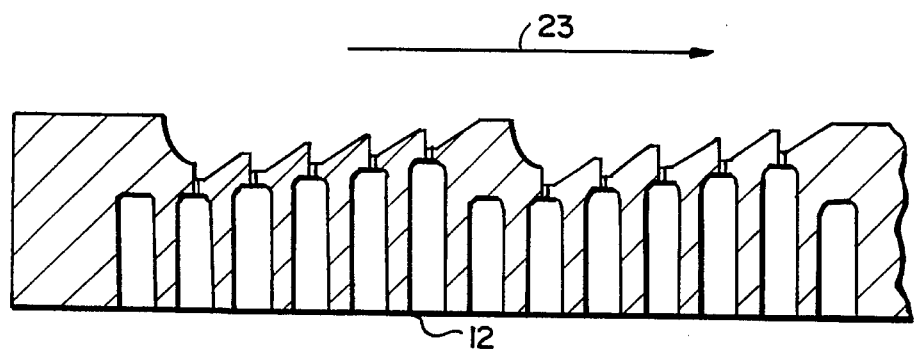
FIG. 6 is a view like that of FIG. 5 showing the configuration of a cylinder or plate according to the invention with ten slots per inch.

While the construction of the macro and micro grooves 22, 24 can vary widely, the construction thereof illustrated in FIGS. 3, 5, and 6 is particularly suitable for achieving the objectives of the invention. Note in this particular embodiment that the macro grooves 22 have an upstream (with respect to the general direction of the pulp flow 23) side wall 33, and that there is a substantially flat portion 34, generally parallel to the flow direction 23, between adjacent macro grooves 22. The lowest point of the macro groove 22 is indicated at 35 in FIG. 3, essentially the root of the upstream side wall 33. While the upstream side wall 33 may be perpendicular to the flow direction 23, for optimum operation preferably it makes an angle 36 with respect to the flow direction 23 that is between about 100°–110°, e.g. about 105°.

The preferred configuration of the micro grooves 24 is illustrated with respect to FIG. 5 for clarity. In the both the constructions of FIGS. 3 and 5, four micro grooves 24 are provided within each macro groove 22, which is a suitable construction if eight slots 27 per inch of screen surface in the direction of flow 23 are desired.

Each micro groove 24 has an upstream side wall 39, a downstream side wall 40, and a depression 41 between them. The upstream side wall 39 preferably is substantially planar, although it can be curved, and while it may be perpendicular to the flow direction 23 preferably makes an angle 42 with respect thereto of between about 85°–120° (preferably about 95°–105°), e.g. for example 98.36°. The angle 42 is typically less than the angle 36. The purpose of this angle 42 being within this range is that in some more demanding applications "back-tracking" of pulp flow is required, which improves fluidization at the slots or holes 27, increasing throughput. Alternatively this increase in fluidization/throughput can be traded in for providing still smaller slots or holes 27 and accordingly better debris removal efficiency.

The downstream side wall 40 makes an angle 43 with respect to the flow direction 23. The angle 43 is between 5°–60°, for example about 20°–40°, depending upon the number of slots per inch and other factors (e.g. about 30° for the configuration of FIG. 5, about 35° for the configuration of FIG. 6). The surface 40 also preferably is substantially planar, although it too can be curved, and the gradual slope provided thereby allows ready flow of non-accepted pulp out of the depression 41.

The depression 41 typically has a lowermost point or "bottom" 44. The bottom 44 may—as seen in FIG. 5—be a substantially flat portion generally parallel to the direction 23 (e.g. about 0.5 mm in the direction of flow 23), or it may merely be a continuation of the downstream wall 40. The slots or openings 27 preferably are provided in the depression 41, at the lowermost area thereof, e.g. bottom 44, and preferably are located as close to the upstream side wall 39 as practical, given manufacturing tolerances, etc.

As readily seen in FIGS. 3, 5, and 6, the depressions 41 of consecutive micro grooves 24 have different spacings from the accepts surface 12. The first micro groove 24 within each macro groove 22 has a depression 41, including the lowest area or lowest point 44, closest to the accepts surface 12, with this spacing increasing as one moves in the direction 23 toward the last micro groove 24 associated with a macro groove 22. The spacing of the depression 41 from the accepts surface 12 may increase, for example, about 2–3 mm from the first micro groove 24 within a macro groove 22 to the last. Preferably, there are also substantially flat portions 45, generally parallel to the flow direction 23, between micro grooves 24. The lengths of these substantially flat portions 45 between the downstream wall 40 of one micro groove 24 and the upstream wall 39 of the next is typically less than the length of the flat portions 34 between macro grooves 22.

Each of the micro grooves 24 includes a peak portion of a downstream wall 40, the peak portion typically being provided by the substantially flat surface 45. The macro grooves 22 are configured so that a substantially straight (imaginary) line 47 extending through all of these peak portions (45) makes an angle 48 (see FIG. 5) with respect to the flow direction 23. That angle 48 preferably is between about 5°–15°, e.g. about 8.36°. Preferably also, the flat portions 45 are not exactly parallel to the flow direction 23, but rather are disposed along the line 47 (e.g. make an angle of about 8.36°) with respect thereto. The imaginary line 47 defines what might be considered the downstream side wall of the macro groove 22, corresponding to the bottom portion of the line 30 in FIG. 4.

Dimensions of the various surface manifestations of the grooves 22, 24 can vary widely depending upon the particular material being screened, the particular pressure screen 13, whether throughput or efficiency is to be maximized, and a wide variety of other factors. However one typical set of dimensions for the structure illustrated in FIG. 5 is as follows: The thickness 50 of the wall of the screen 10 (between the most widely spaced portions of the surfaces 11, 12) is about 8 mm. The length 51 of each micro groove 24 (from upstream side wall 39 thereof to the start of the substantially flat peak portion 45) is about 2.56 mm. The height of so the upstream side wall 39 of each micro groove 24 is about 0.81 mm. The radius of the root portion 35 of each macro groove 22 is about 1 mm. The length of each substantially flat peak portion 45 between micro grooves 24 is about 0.6 mm. The angle 43 is about 30°. The angle 48 is about 8.36°; and the angle 42 is about 98.36°.

Also it is desirable to optimize slot width or hole diameter for a particular situation. Obviously the smaller the slot sizes the more effective the screening action will be, however throughput will be adversely affected. However according to the present invention slots having a width of about 0.1–1.0 mm and substantially round holes having a diameter of about 0.5–30 mm. can easily be accommodated, with acceptable to excellent throughput. Holes of a size at the larger end of this range would be used in screening difficult large size debris fractions in coarse screening applications, while the slots and smaller holes would be used in fine screening.

FIG. 6 is the same as FIG. 5 only it shows a modification in which ten slots 27 are provided per inch instead of eight as in FIG. 5. While the basic configuration is the same, including the angles 48, 36, and 42, a number of parameters necessarily change. For example because five micro grooves 24 are provided per macro groove 22 instead of four in the FIG. 5 embodiment, in the FIG. 6 embodiment the dimension of the surface 45 in the direction 23 is about 0.44 mm, the angle 43 is about 35°, the distance 51 is about 2.05 mm, and the height of the upstream side walls 39 is about 0.78 mm. Typically the spacing between slots in the FIG. 6 embodiment is 2.5 mm while that spacing in the FIG. 5 embodiment is about 3.2 min.

While the invention has been described with regard to regular micro groove and macro groove configurations, and while regular configurations would be the easiest to manufacture, under some circumstances the macro groove and/or micro groove configurations could be different in the same cylinder 10. For example the micro groove configurations could vary from one macro groove to the next, and the macro groove configurations themselves could also vary. Also, as earlier indicated, the exact details of the contours of the micro grooves 22 may vary widely within the scope of the invention. For example, and example only, virtually any of the configurations illustrated in U.S. Pat. Nos. 5,073,254 or 5,000,842 could be utilized, the configurations of PCT publication WO 91/05911 or Japanese Hei 2-264092, etc.

While FIG. 1 schematically illustrates the screening surface 11—having a configuration such as in FIGS. 3, 5 and/or 6—over the entire length of the screen 10, the particular contours according to the invention may in some applications be employed only adjacent the reject end [the bottom end, e.g. the bottom one-tenth to one-half, such as the bottom third, in FIG. 2] of the cylinder 10 rather than over the entire surface, with standard contours (e.g. such as in U.S. Pat. No. 4,529,520) over the rest of the surface 11. Such cylinders—with different sections—may be manufactured effectively using the teachings of U.S. Pat. Nos. 4,264,438 and/or 4,986,900 (the disclosures of which are hereby incorporated by reference herein).

Especially when abrasive rejects material is encountered, some of the screen cylinder sections may be made of ceramic instead of metal (typically steel), such as shown by U.S. Pat. No. 4,986,900; or highly wear resistant materials may be cast instead of milled. A combination of castings and sizing aperture machining with, e.g., water-jet or laser cutting is another option. The ridge (34 in FIG. 3) between two macro grooves can be further magnified or fortified by applying stellite or laser welded beads. Premature wear of this point can also be repaired by welding.

In a typical utilization of the screen cylinder 10 according to the present invention, pulp having a consistency of between about 1–5% may be screened to produce accepts and rejects. For example the pulp flows into the inlet 18 of the pressure screen 13 of FIG. 2, and is moved by the rotating foil 16 with respect to the screening surface 11. Shear stresses introduced by the macro grooves 22 keep the rejects material of the pulp flowing in direction 23 in substantially constant motion, while the micro grooves 24 direct pulp flow toward the slots 27, and effect fluidization of the pulp so that accepts pass more readily through the slots 27. Practicing the invention it is possible to not only achieve the high debris removal efficiency (e.g. above about 85%) of the conventional PROFILE® contoured screen cylinder, but also to have a lower reject rate (between about 3–10%, e.g. about 5%), providing a higher concentration of debris in the rejects outlet 20 and a higher ratio of accepts material to inlet material in the accepts outlet 19.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A screen cylinder or plate having a screening surface and an accepts surface on opposite faces thereof, for screening pulp flowing in a flow direction, to separate accepts from rejects, and comprising:

a plurality of substantially parallel macro grooves formed in said screening surface generally transverse to said flow direction;

a plurality of substantially parallel micro grooves formed in at least a portion of said screening surface within each macro groove and generally transverse to said flow direction; and each of said micro grooves comprising contoured surface manifestations which induce micro-turbulence to fluidize pulp at the immediate area of screening, and at least one opening extending between said screening surface and said accepts surface for allowing passage of accepts therethrough.

2. A screen cylinder or plate as recited in claim 1 wherein each of said micro grooves has substantially the same contour of surface manifestations, and said macro grooves each have a contoured configuration that simulates the contour of each of said micro grooves within it.

3. A screen cylinder or plate as recited in claim 1 wherein at least four micro grooves are provided in each of said macro grooves, and wherein said macro and micro grooves are provided in substantially said entire screening surface.

4. A screen cylinder or plate as recited in claim 2 wherein each of said micro grooves has a contour and surface manifestation defined by an upstream wall generally transverse to said flow direction, a depression located closer to said accepts than said upstream wall, and a downstream wall extending gradually from said depression toward the upstream wall of the next groove, said at least one opening extending at least in part from said depression to said accepts surface.

5. A screen cylinder or plate as recited in claim 4 wherein said upstream wall of each of said micro grooves is substantially planar, and makes an angle of between about 85°–120° with respect to said flow direction.

6. A screen cylinder or plate as recited in claim 5 wherein said downstream wall is substantially planar, and makes an angle between about 5°–60° with respect to said flow direction.

7. A screen cylinder or plate as recited in claim 6 wherein said depression comprises a continuation of said downstream wall, or a substantially flat surface parallel to said flow direction, and wherein said at least one opening is completely within said depression.

8. A screen cylinder or plate as recited in claim 7 wherein said openings comprise slots, at least one slot being provided in each micro groove.

9. A screen cylinder or plate as recited in claim 4 wherein said contour of surface manifestations of each of said micro grooves further comprises a first substantially flat portion substantially parallel to said flow direction extending from the downstream wall of one micro groove to the upstream wall of the next micro groove.

10. A screen cylinder or plate as recited in claim 9 wherein each of said macro grooves has an upstream wall distinct from the upstream wall of any micro groove, and further comprising a second substantially flat portion substantially parallel to said flow direction between each of said macro grooves, said second flat portion having a greater length than said first flat portion.

11. A screen cylinder or plate as recited in claim 10 wherein said upstream walls of said micro grooves make an angle of about 95°–105° with respect to said flow direction, and wherein said upstream walls of said macro grooves make an angle of about 100°–110° with respect to said flow direction, and greater than said micro groove upstream wall angle.

12. A screen cylinder or plate as recited in claim 4 wherein each of said openings comprises a slot that is located in said depression as close as practical to said upstream wall, and has a dimension in said flow direction of between about 0.1 mm–1.0 mm.

13. A screen cylinder or plate as recited in claim 4 wherein at least four micro groove are provided in each of said macro grooves; and wherein each of said downstream walls has a peak portion which is the furthermost portion of said downstream wall from said accepts surface; and wherein an imaginary line interconnecting said peak portions from the first micro groove in each macro groove in said flow direction to the last micro groove in a macro groove in said flow direction makes an angle of between about 5° and 15° with respect to said flow direction.

14. A screen cylinder or plate having a screening surface and an accepts surface on opposite faces thereof for screening pulp flowing in a flow direction to produce accepts and rejects, comprising:

a plurality of substantially parallel consecutive grooves formed in said screening surface, each groove having at least one opening extending between said screening surface and said accepts surface, at an opening-receiving area spaced from said accepts surface; and wherein at least three substantially consecutive grooves have significantly different spacings of said opening-receiving areas thereof from said accepts surface.

15. A screen cylinder or plate as recited in claim 14 wherein said at least three substantially consecutive grooves are disposed in sequence so that in the direction of flow the spacings of the opening-receiving areas thereof from said accepts surface increase.

16. A screen cylinder or plate as recited in claim 15 wherein said consecutive grooves with different spacings are in repeating patterns along said screening surface, substantially completely covering at least one-tenth of said screening surface.

17. A screen cylinder or plate as recited in claim 16 wherein said repeating patterns include four grooves per pattern.

18. A screen cylinder or plate as recited in claim 16 wherein said repeating patterns include five grooves per pattern, and wherein said repeating patterns substantially completely cover said screening surface.

19. A screen cylinder or plate as recited in claim 14 wherein said opening-receiving surfaces are low points of said grooves, being the points of said grooves closest to said accept surface.

20. A screen cylinder or plate as recited in claim 14 wherein at least most of said grooves has a contour and surface manifestation defined by an upstream wall generally transverse to said flow direction, a depression located closer to said accepts than said upstream wall, and a downstream wall extending gradually from said depression toward the upstream wall of the next groove, said at least one opening extending from said depression to said accepts surface.

21. A screen cylinder or plate as recited in claim 20 wherein said downstream wall is substantially planar, and makes an angle between about 5°–60° with respect to said flow direction.

22. A screen cylinder or plate as recited in claim 21 wherein said upstream wall is substantially planar, and makes an angle of between about 85°–120° with respect to said flow direction.

23. A screen cylinder or plate as recited in claim 22 wherein each of said openings comprises a slot that is located in said depression as close as practical to said upstream wall, and has a dimension in said flow direction of between about 0.1 mm–1.0 mm.

24. A pressure screen for screening pulp, including a foil, a screen cylinder, means for moving said foil and said screen cylinder with respect to each other, an inlet for pulp, an accepts outlet, and a rejects outlet; and wherein said screen cylinder comprises:

a plurality of substantially parallel micro grooves formed in at least a portion of said screening surface within each macro groove and generally transverse to said flow direction; and each of said micro grooves comprising contoured surface manifestations which induce micro-turbulence to fluidize pulp at the immediate area of screening, and at least one opening extending between said screening surface and said accepts surface for allowing passage of accepts therethrough; and wherein said macro and micro grooves cover said screening surface at least adjacent said rejects outlet.

25. A pressure screen for screening pulp, including a foil, a screen cylinder, means for moving said foil and said screen cylinder with respect to each other, an inlet for pulp, an accepts outlet, and a rejects outlet; and wherein said screen cylinder comprises:

a plurality of substantially parallel consecutive grooves formed in said screening surface, each groove having at least one opening extending between said screening surface and said accepts surface, at an opening-receiving area spaced from said accepts surface; and wherein at least three substantially consecutive grooves have significantly different spacings of said opening-receiving areas thereof from said accepts surface; and wherein said consecutive grooves cover said screening surface at least adjacent said rejects outlet.

26. A screen cylinder having a screening surface and an accepts surface disposed on opposite faces thereof, for screening pulp flowing in a flow direction to produce accepts, and rejects comprising reject material, with screening openings extending between said screening and accepts surfaces, and a plurality of substantially parallel grooves disposed substantially perpendicular to said flow direction, formed in at least a portion of said screen surface, and including surface manifestations for inducing shear stresses in said reject material flowing with pulp in said constant motion to prevent a mat or layer of reject material forming on said screening surface, and for inducing micro turbulence into pulp flowing in said flow direction at the immediate area of said screening openings at said screening surface, to fluidize the pulp thereat so that accepts readily pass through said openings toward said accepts surface; and wherein said plurality of substantially parallel grooves comprise a plurality of macro grooves, with a plurality of micro grooves within each macro groove, and wherein said surface manifestations for inducing shear stress include surface manifestations of said macro grooves, and wherein said surface manifestations for inducing micro turbulence comprise surface manifestations of said micro grooves.

27. A screen cylinder as recited in claim 26 wherein each of said micro grooves has a contour and surface manifestation defined by an upstream wall generally transverse to said flow direction, a depression located closer to said accepts than said upstream wall, and a downstream wall extending gradually from said depression toward the upstream wall of the next groove, said at least one opening extending at least in part from said depression to said accepts surface.

28. A screen cylinder as recited in claim 27 wherein said contour and surface manifestations of each of said micro grooves further comprises a first substantially flat portion substantially parallel to said flow direction extending from the downstream wall of one micro groove to the upstream wall of the next micro groove; wherein each of said macro grooves has an upstream wall distinct from the upstream wall of any micro groove, and further comprises a second substantially flat portion substantially parallel to said flow direction between said macro grooves, said second flat portion having a greater length than said first flat portion; wherein said upstream walls of said micro grooves make an angle of about 85°–120° with respect to said flow direction; and wherein said upstream walls of said macro grooves make an angle of about 100°–110° with respect to said flow direction, and greater than said micro groove upstream wall angle.

29. A screen cylinder as recited in claim 28 wherein each of said openings is located wholly in said depression, and as close as practical to said upstream wall, and comprises a slot which has a dimension in said flow direction of between about 0.1 mm–1.0 mm, or a substantially round hole having a diameter of about 0.5–3.0 mm.

* * * * *